(12) United States Patent
Defaux et al.

(10) Patent No.: US 8,796,161 B2
(45) Date of Patent: Aug. 5, 2014

(54) METHOD FOR COATING A TEXTILE MEDIUM

(75) Inventors: Pierre Defaux, Lyons (FR); Bernard Moulin, Brignais (FR)

(73) Assignee: Bluestar Silicones France SAS, Lyons (FR)

( * ) Notice: Subject to any disclaimer, the term of this patent is extended or adjusted under 35 U.S.C. 154(b) by 248 days.

(21) Appl. No.: 13/376,154

(22) PCT Filed: Jun. 3, 2010

(86) PCT No.: PCT/FR2010/000411
§ 371 (c)(1),
(2), (4) Date: Mar. 14, 2012

(87) PCT Pub. No.: WO2010/139868
PCT Pub. Date: Dec. 9, 2010

(65) Prior Publication Data
US 2012/0164406 A1   Jun. 28, 2012

(30) Foreign Application Priority Data

Jun. 5, 2009  (FR) .................................... 09 02739

(51) Int. Cl.
*B23B 27/04* (2006.01)
*B32B 27/12* (2006.01)
*B32B 5/02* (2006.01)
*C07F 7/18* (2006.01)

(52) U.S. Cl.
USPC ....... 442/101; 106/287.13; 427/387; 427/513

(58) Field of Classification Search
USPC ............. 528/16; 156/329; 523/218; 428/196; 106/287.13; 427/387, 513; 442/101
See application file for complete search history.

(56) References Cited

U.S. PATENT DOCUMENTS

| 5,371,163 A | 12/1994 | Wilson |
| 7,151,149 B1 * | 12/2006 | Barrandon et al. ............. 528/16 |
| 2007/0106016 A1 | 5/2007 | Zhu |

FOREIGN PATENT DOCUMENTS

| FR | 2 887 124 | 12/2006 |
| FR | 2 899 248 | 10/2007 |
| FR | 10 2006 033 393 | 1/2008 |
| FR | 2 904 194 | 2/2008 |

OTHER PUBLICATIONS

International Search Report for PCT/FR2010/000411 Mailed Oct. 6, 2010.

* cited by examiner

*Primary Examiner* — Lynda Salvatore
(74) *Attorney, Agent, or Firm* — Miles & Stockbridge P.C.

(57) ABSTRACT

The present invention relates to a method of coating a textile with a silicon elastomer composition that can be crosslinked by polyaddition, enabling the textile to be given a non-slip property. The invention also relates to textile articles thus coated, such as clothing and lace, exhibiting good adhesion to various mediums, such as skin, another textile, a fibrous medium, etc.

18 Claims, No Drawings

METHOD FOR COATING A TEXTILE MEDIUM

CROSS REFERENCE TO RELATED APPLICATIONS

This application is a §371 National Stage Application of PCT/FR2010/000411, filed Jun. 3, 2010, which claims priority to French Application No. 0902739, filed Jun. 5, 2009.

BACKGROUND OF THE INVENTION

1. Field of the Invention

The present invention relates to a process for coating a textile medium with a polyaddition-crosslinkable elastomeric silicone composition, enabling the textile to be given a nonslip property. The invention also relates to textile articles thus coated, such as clothing and lace, exhibiting good adhesion to various mediums, such as skin, another textile, a fibrous medium, etc.

2. Description of Related Art

The general field of the invention is that of the use of silicone compositions that can be crosslinked by polyaddition reactions to produce an elastomer in thin film form as coating for various textiles.

Such silicone coatings may be obtained by coating fibrous mediums followed by crosslinking through the polyaddition of the unsaturated groups (alkenyl, e.g. Si-Vi, groups) of a polyorganosiloxane onto hydrogens of the same or another polyorganosiloxane.

It is known to use silicone compositions for coating textile materials in order to obtain adhesion to skin and nonslip properties, such as in particular for certain items of clothing and hygiene articles. However, the adhesion or tack effect is insufficient by itself to provide the nonslip effect. The latter is supplemented by compression of the textile material onto the skin.

However, to improve wearer comfort, it is important to reduce the compression needed to provide the nonslip effect by increasing the tack of the coated textile material on the skin. The level of tack must be optimized. This is because too high a level of tack is manifested by a strong bonding sensation that is unpleasant and uncomfortable for the user. In contrast, too low a level of tack does not fulfill the nonslip function and greater compression is needed. These constraints are presently encountered particularly in the field of self-fixing stockings which may be for medical use (support stockings) or for pleasure.

Thus, to reduce the compression sensation felt by the user, patent application FR 2887124 relates to the use of a silicone foam prepared from a three-component silicone composition. One of the components is a swelling agent having a deformability effect so as to reduce the compression of the textile material on the skin.

Moreover, the silicone compositions generally used for coating a textile material are greatly impregnated into said textile material, especially by coating the yarns and fibers, and pass through said material, thus appearing on the side opposite that initially coated. Now, this poses esthetic problems of a visual kind and problems when subsequently coloring this textile material.

Patent application FR 2899248 teaches a silicone composition crosslinkable by polyaddition reaction containing a thixotropic agent that provides said composition with a good compromise of properties in terms of adhesion to the user's skin while preventing depthwise impregnation of the textile surface and especially transfer of the silicone composition into or out to the other side of the textile surface.

Measures should also be taken to ensure that, after the silicone composition has coated the textile and been crosslinked, no leaching of oily substances that might stain the textile and/or its packaging occurs.

This silicone composition must also be nontoxic and odorless.

It is also desirable for the coating to be able to be wash-resistant and rub-resistant and for it to have a good elongation resistance when the textile material is being handled.

SUMMARY

In this context, one of the essential objectives of the present invention is to develop a process for coating a textile with a polyaddition-crosslinkable elastomeric silicone composition which, after crosslinking on the textile, provides a tack effect without increasing the compression of the textile material on the skin.

Another essential objective of the present invention is to provide a silicone composition which is nontoxic, in particular not containing tin-based catalysts, is odorless and does not pass through the textile surface during the coating thereof.

Another essential objective of this invention is to provide a textile coated with a polyaddition-crosslinked silicone composition which as a certain level of tack, with slight compression on the skin, and which does not leach oily substances that may stain the textile material or its packaging.

All these objectives, among others, are achieved by the present invention, which relates to a process for coating a silicone composition (A), which is a precursor of an elastomer and is polyaddition-crosslinkable, onto a textile medium, said process comprising the following steps a), b) and c):

a) A silicone composition (A) which is a precursor of an elastomer and is polyaddition-crosslinkable, comprising:

at least one linear or branched polyorganosiloxane (B) carrying alkenyl groups and comprising:

1) terminal siloxyl units of type $M=(X)_s(R)_tSiO_{1/2}$ in which the radicals R, which are identical or different, correspond to a $C_1$-$C_6$ linear or branched alkyl group, optionally substituted, or a substituted or unsubstituted aryl group, and the radicals X correspond to alkenyl groups having 2 to 6 carbon atoms, preferably vinyl groups, with s=0 or 1, t=2 or 3 and s+t=3; and 2) siloxyl units, which are identical or different, of type $D=(X)_u(R^1)_vSiO_{2/2}$ in which the radicals $R^1$ meet the same definition as for R, the radicals X correspond to alkenyl groups having 2 to 6 carbon atoms, preferably vinyl groups, with u=0 or 1, v=1 or 2 and u+v=2, with the condition whereby the polyorganosiloxane (B) comprises at least two radicals X per molecule;

at least one linear or branched polyorganosiloxane (C) carrying one alkenyl group per molecule and comprising:

1) terminal siloxyl units, which are identical or different, of type $M=(X)_w(R^2)_xSiO_{1/2}$ in which the radicals X correspond to alkenyl groups having 2 to 6 carbon atoms, preferably vinyl groups, and the radicals $R^2$ meet the same definition as for R, with w=0 or 1, x=2 or 3 and w+x=3; and 2) siloxyl units $D=(X)_y(R^3)_zSiO_{2/2}$ in which the radicals X correspond to alkenyl groups having 2 to 6 carbon atoms, preferably vinyl groups, and the radicals $R^3$ meet the same definition as for R, with y=0 or 1, z=1 or 2 and y+z=2, with the condition whereby the polyorganosiloxane (C) comprises just one radical X per molecule;

at least two hydrogenopolyorganosiloxanes (D), one (D-1) having a chain extender role and the other (D-2) having a crosslinking role:

said chain extender hydrogenopolyorganosiloxane (D-1) comprising:

1) terminal siloxyl units of type $M=(R^4)_2(H)SiO_{1/2}$ in which the radicals $R^4$ meet the same definition as for R and 2) siloxyl units, which are identical or different, of type $D=(R^5)_2SiO_{2/2}$ in which the radicals $R^5$ meet the same definition as for R, with the condition whereby the chain extender hydrogenopolyorganosiloxane (D-1) comprises two SiH functional groups per molecule;

said crosslinking hydrogenopolyorganosiloxane (D-2) comprising:

1) terminal siloxyl units of type $M=(R^6)_2(H)SiO_{1/2}$ in which the radicals $R^6$ meet the same definition as for R and 2) siloxyl units, which are identical or different, of type $D=(R^7)_p(H)_qSiO_{2/2}$ in which the radicals $R^7$ meet the same definition as for R, with p=1 or 2, q=0 or 1 and p+q=2, with the condition whereby the crosslinking hydrogenopolyorganosiloxane (D-2) comprises at least three SiH functional groups per molecule;

at least one mineral filler (E);

an effective amount of at least one hydrosilylation catalyst (F);

at least one crosslinking inhibitor (G);

optionally at least one reactive polyorganosiloxane (H) comprising:

1) terminal siloxyl units of type $M=(R^8)_3SiO_{1/2}$ in which the radicals $R^8$ meet the same definition as for R and 2) siloxyl units, which are identical or different, of type $D=(R)_2SiO_{2/2}$ in which the radicals $R^9$ meet the same definition as for R; and optionally a formulation additive (I), with the additional condition that the amounts of the polyorganosiloxanes (B), (C) and (D) are chosen so that the molar ratio r2 of the hydrogen atoms linked to the silicon of the crosslinking hydrogenopolyorganosiloxanes (D-2) for the alkenyl radicals linked to the silicon of the polyorganosiloxanes (B) and (C) is defined as follows:

$0.10 \leq r_2 \leq 0.40$, preferably $0.15 \leq r_2 \leq 0.35$ and even more preferably $0.20 \leq r_2 \leq 0.30$ is prepared;

b) next, said silicone composition (A) is deposited continuously or discontinuously on said textile medium; and c) crosslinking of said silicone composition (A) is effected by heating and/or by infrared radiation.

DETAILED DESCRIPTION OF A PREFERRED EMBODIMENT

To achieve these objectives, it is to the merit of the inventors that they have demonstrated, completely surprisingly and unexpectedly, that the following features of the silicone composition (A) according to the invention:

1) the presence of at least one polyorganosiloxane (C) having a single alkenyl unit per (monoalkenylated polyorganosiloxane) molecule; and 2) the maintaining of a ratio $r_2$ within a specific range, in this case $0.10 \leq r_2 \leq 0.40$, the ratio $r_2$ being the molar ratio of the hydrogen atoms linked to the silicon of the crosslinking hydrogenopolyorganosiloxanes (D-2) to the alkenyl radicals linked to the silicon of the polyorganosiloxanes (B), make it possible to obtain, using the process for the invention, a coated textile having a good level of tack to the skin.

The crosslinking step is preferably carried out using hot air or electromagnetic radiation, for example infrared radiation, especially for a time of 10 seconds to 10 minutes, at a crosslinking temperature below the temperature at which the textile surface degrades. The drying operation is generally carried out so as to give the crosslinked silicone composition a dry feel.

According to a preferred embodiment, the polyorganosiloxanes (B), (C) and (D) are added to the silicone composition (A) so that the molar ratio r of the hydrogen atoms linked to the silicon of the hydrogenopolyorganosiloxanes (D-1) and (D-2) to the alkenyl radicals linked to the silicon of the polyorganosiloxanes (B) and (C) is greater than 1 and preferably between 1 and 1.35 and even more preferably between 1 and 1.25.

Preferably, the silicone composition (A) has a dynamic viscosity of greater than 100 000 mPa·s. All the viscosities mentioned in the present text correspond to dynamic viscosities measured, in a manner known per se, at 25° C. using a Brookfield instrument according to the AFNOR NFT 76 102 standard of February 1972. With highly fluid products, the viscosity in question in the present description is what is called the "Newtonian" viscosity at 25° C., that is to say the dynamic viscosity measured, in a manner known per se, at a sufficiently low shear rate so that the measured viscosity is independent of the rate.

According to a preferred embodiment of the invention, the silicone composition (A) is obtained by mixing at least two parts P1 and P2 comprising the constituents (B) to (G) and optionally (H) and (I), with the condition that the catalyst (F) for the hydrosilylation reaction is separate from the constituent (D). The viscosity of the parts P1 and P2 and the viscosity of the mixture thereof may be adjusted by varying the amounts of the constituents and by choosing polyorganosiloxanes of different viscosity.

According to one particularly preferred embodiment, the silicone composition (A) used comprises the constituents (B) to (I) in the following proportions, expressed as percentage by weight relative to the total weight of the silicone composition (A):

(B) from 40 to 90
(C) from 4 to 20
(D-1) from 1 to 2
(D-2) from 0.1 to 0.6
(E) from 5 to 20
(F) from 0.005 to 0.25
(G) from 0.010 to 0.020
(H) from 0 to 10
(I) from 0 to 5.

According to an even more particularly preferred embodiment, the silicone composition (A) used according to the invention comprises the constituents (B) to (I) in the following proportions, expressed as percentage by weight relative to the total weight of the silicone composition (A):

(B) from 50 to 85
(C) from 8 to 18
(D-1) from 1.2 to 1.8
(D-2) from 0.2 to 0.5
(E) from 8 to 18
(F) from 0.005 to 0.25
(G) from 0.010 to 0.020
(H) from 0 to 5
(I) from 0 to 3.

According to yet another even more particularly preferred embodiment, the silicone composition (A) used according to the invention comprises the constituents (B) to (I) in the following proportions, expressed as percentage by weight relative to the total weight of the silicone composition (A):

(B) from 60 to 80
(C) from 10 to 17
(D-1) from 1.2 to 1.8
(D-2) from 0.2 to 0.5
(E) from 10 to 17
(F) from 0.005 to 0.25
(G) from 0.010 to 0.020
(H) from 0 to 2
(I) from 0 to 1.

According to a preferred embodiment of the invention, in step b) said silicone composition (A) is deposited on the textile medium by a transfer roll coater, by a lick roll coater or by spraying using a nozzle, a doctor blade, a rotary frame or by a reverse roll coater. The thickness of the layer of the composition (A) deposited on the textile is between 0.1 and 0.5 mm, preferably between 0.1 and 0.4 mm and even more preferably between 0.1 and 0.3 mm.

For the purposes of the invention, the term "textile" is a generic term that includes all textile structures. The textiles may consist of yarns, fibers, filaments and/or other materials. They especially comprise supple fabrics, whether they be woven, bonded, knitted, braided, felted, needled, sewn or produced by another process for manufacture.

These textiles may be apertured, that is to say they may comprise free spaces not consisting of textile. In order for the coating with the silicone composition of the invention to be effective, it is preferable for the smallest size of these free spaces to be less than 5 mm, especially less than 1 mm.

The term "yarn" is understood for example to mean a continuous multifilament object, a continuous yarn obtained by assembling a plurality of yarns or a spun yarn of continuous fibers, which is obtained from just one type of fiber, or from a mixture of fibers. The term "fiber" is understood for example to mean a short or long fiber, a fiber intended to be worked by spinning or for the manufacture of nonwoven articles or a cable or cord intended to be chopped to form short fibers. It is entirely possible for the textile to be formed from yarns, fibers and/or filaments that have undergone one or more treatment steps before the textile medium is produced, such as for example texturing, stretching, stretch-texturing, sizing, relaxing, hot-bonding, twisting, setting, creping, washing and/or dyeing steps.

According to the invention, any type of textile medium may be used. By way of indication, the following may be mentioned:

natural textiles, such as the following: textiles of plant origin, for example cotton, linen, hemp, jute, coconut and paper cellulose fibers; and tiles of animal origin, such as wool, fur, leather and silk;

artificial textiles such as the following: cellulose-based textiles, such as cellulose or derivatives thereof; and protein textiles of animal or plant origin; and synthetic textiles, such as polyester, polyamide, polymalyl alcohol, polyvinyl chloride, polyacrylonitrile, polyolefin, acrylonitrile, (meth)acrylate-butadiene-styrene copolymer and polyurethane textiles.

The synthetic textiles obtained by polymerization or polycondensation may especially comprise, in their matrix, various types of additives such as pigments, delustrants, matting agents, catalysts, heat and/or light stabilizers, antistatic agents, fire retardants and antibacterial, antifungal and/or anti-acarial agents.

As types of textile surfaces, the following may in particular be mentioned: surfaces obtained by linear interlocking of yarns or fabrics, surfaces obtained by curvilinear interlacement of yarns or knits, mixtilinear surfaces or tulles, nonwoven surfaces and composite surfaces. Among the numerous possible textile surfaces that can be used in the process for the invention, the following may be mentioned: felts, denims, jacquard wovens, needled fabrics, sewn fabrics, crocheted fabrics, grenadines, laces, pinked fabrics, damasks, voile fabrics, alpaca fabrics, barathea fabrics, dimity fabrics, looped fabrics, brocades, calicos, velvets, canvasses, chiffons, flocked fabrics, sized fabrics, buntings, braids, failles, foulards, cheese-cloths, geotextiles, jaspé fabrics, matelassés, tufted fabrics, organzas, pleated fabrics, ribbons and toiles.

The textile medium used in the process for the present invention may consist of one or more identical or different textiles assembled in various ways. The textile may be a monolayer or a multilayer. For example, the textile medium may consist of a multilayer structure that may be produced by various means of assembly, such as by mechanical means, for instance sewing, welding or bonding, in spots or as a seam.

The textile medium may undergo, apart from the coating process according to the present invention, one or more other subsequent treatments, also called finishing or ennobling treatments. These other treatments may be carried out before, after and/or during said coating process for the invention. As other subsequent treatments, the following may in particular be mentioned: dyeing, printing, laminating, coating, assembly with other textile materials or surfaces, washing, degreasing, preforming or setting.

According to a preferred embodiment of the invention, the textile medium is a lace or an elastic strip.

Another subject of the present invention is a silicone composition (A) which is a precursor of an elastomer and is polyaddition-crosslinkable, comprising:

at least one linear or branched polyorganosiloxane (B) carrying alkenyl groups and comprising:

1) terminal siloxyl units of type $M=(X)_s(R)_tSiO_{1/2}$ in which the radicals R, which are identical or different, correspond to a $C_1$-$C_6$ linear or branched alkyl group, optionally substituted, or a substituted or unsubstituted aryl group, and the radicals X correspond to alkenyl groups having 2 to 6 carbon atoms, preferably vinyl groups, with s=0 or 1, t=2 or 3 and s+t=3; and 2) siloxyl units, which are identical or different, of type $D=(X)_u(R^1)_vSiO_{2/2}$ in which the radicals $R^1$ meet the same definition as for R, the radicals X correspond to alkenyl groups having 2 to 6 carbon atoms, preferably vinyl groups, with u=0 or 1, v=1 or 2 and u+v=2, with the condition whereby the polyorganosiloxane (B) comprises at least two radicals X per molecule;

at least one linear or branched polyorganosiloxane (C) carrying one alkenyl group per molecule and comprising:

1) terminal siloxyl units, which are identical or different, of type $M=(X)_w(R^2)_xSiO_{1/2}$ in which the radicals X correspond to alkenyl groups having 2 to 6 carbon atoms, preferably vinyl groups, and the radicals $R^2$ meet the same definition as for R, with w=0 or 1, x=2 or 3 and w+x=3; and 2) siloxyl units $D=(X)_y(R^3)_zSiO_{2/2}$ in which the radicals X correspond to alkenyl groups having 2 to 6 carbon atoms, preferably vinyl groups, and the radicals $R^3$ meet the same definition as for R, with y=0 or 1, z=1 or 2 and y+z=2, with the condition whereby the polyorganosiloxane (C) comprises just one radical X per molecule;

at least two hydrogenopolyorganosiloxanes (D), one (D-1) having a chain extender role and the other (D-2) having a crosslinking role:

said chain extender hydrogenopolyorganosiloxane (D-1) comprising:
1) terminal siloxyl units of type $M=(R^4)_2(H)SiO_{1/2}$ in which the radicals $R^4$ meet the same definition as for R and
2) siloxyl units, which are identical or different, of type $D=(R^5)_2SiO_{2/2}$ in which the radicals $R^5$ meet the same definition as for R, with the condition whereby the chain extender hydrogenopolyorganosiloxane (D-1) comprises two SiH functional groups per molecule;

said crosslinking hydrogenopolyorganosiloxane (D-2) comprising:
1) terminal siloxyl units of type $M=(R^6)_2(H)SiO_{1/2}$ in which the radicals $R^6$ meet the same definition as for R and
2) siloxyl units, which are identical or different, of type $D=(R^7)_p(H)_qSiO_{2/2}$ in which the radicals $R^7$ meet the same definition as for R, with p=1 or 2, q=0 or 1 and p+q=2, with the condition whereby the crosslinking hydrogenopolyorganosiloxane (D-2) comprises at least three SiH functional groups per molecule;

at least one mineral filler (E);

an effective amount of at least one hydrosilylation catalyst (F);

at least one crosslinking inhibitor (G);

optionally at least one unreactive polyorganosiloxane (H) comprising:
1) terminal siloxyl units of type $M=(R^8)_3SiO_{1/2}$ in which the radicals $R^8$ meet the same definition as for R and
2) siloxyl units, which are identical or different, of type $D=(R)_2SiO_{2/2}$ in which the radicals $R^9$ meet the same definition as for R, and optionally a formulation additive (I), with the additional condition that the amounts of the polyorganosiloxanes (B), (C) and (D) are chosen so that the molar ratio $r_2$ of the hydrogen atoms linked to the silicon of the crosslinking hydrogenopolyorganosiloxanes (D-2) to the alkenyl radicals linked to the silicon of the polyorganosiloxanes (B) and (C) is defined as follows:

$0.10 \leq r_2 \leq 0.40$, preferably $0.15 \leq r_2 \leq 0.35$ and even more preferably $0.20 \leq r_2 \leq 0.30$.

Advantageously, in the silicone composition (A) described above, the polyorganosiloxanes (B), (C) and (D) are added so that the molar ratio r of the hydrogen atoms linked to the silicon of the hydrogenopolyorganosiloxanes (D-1) and (D-2) to the alkenyl radicals linked to the silicon of the polyorganosiloxanes (B) and (C) is greater than 1 and preferably between 1 and 1.30 and even more preferably between 1 and 1.25.

Both for the silicone composition (A) and for the process described above, the polyorganosiloxanes (POS) (B), (C), (D) and possibly (H), namely the main constituents of the compositions according to the invention, may be linear, branched or crosslinked and may in particular include hydrocarbon radicals and reactive groups such as, for example, alkenylsilyl groups and/or hydrogenosilyl groups. Organopolysiloxane compositions are fully described in the literature, and especially in the work by Walter Noll entitled "Chemistry and Technology of Silicones", Academic Press, 1968, 2nd edition, pages 386 to 409.

The polyorganosiloxanes (B) according to the invention have, per molecule, at least two $C_2$-$C_6$ alkenyl unsaturated functional groups X linked to the silicon. The term "alkenyl" is understood to mean a linear or branched, substituted or unsubstituted, unsaturated hydrocarbon chain having at least one olefinic double bond and more preferably just one double bond. Preferably the alkenyl group has 2 to 8 carbon atoms, better still 2 to 6 carbon atoms. This hydrocarbon chain optionally includes at least one heteroatom such as O, N or S. Preferred examples of alkenyl groups are vinyl, allyl and homoallyl groups, a vinyl group being particularly preferred.

The polyorganosiloxanes (B) may also include identical or different radicals R and $R^1$ that correspond to an optionally substituted $C_1$-$C_6$, linear or branched, alkyl group or a substituted or unsubstituted aryl group.

The term "alkyl" denotes a cyclic, linear or branched, saturated hydrocarbon chain optionally substituted (e.g. by one or more alkyls), preferably having 1 to 10 carbon atoms, for example 1 to 8 carbon atoms and better still 1 to 4 carbon atoms. Examples of alkyl groups are especially the following: methyl, ethyl, isopropyl, n-propyl, tert-butyl, isobutyl, n-butyl, n-pentyl, isoamyl and 1,1-dimethylpropyl. The "alkyl" part of the "alkoxy" radical is as defined above. The alkyl may be perfluorinated, the term "perfluorinated alkyl" denoting an alkyl that includes at least one perfluoroalkyl group preferably having the formula:

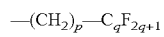
$-(CH_2)_p-C_qF_{2q+1}$ in which: p is 0, 1, 2, 3 or 4; q is an integer from 1 to 10; and $C_qF_{2q+1}$ is linear or branched. Preferred examples of this radical are:

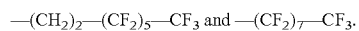
$-(CH_2)_2-(CF_2)_5-CF_3$ and $-(CF_2)_7-CF_3$.

The expression "aryl" denotes an aromatic hydrocarbon group, having 6 to 18 carbon atoms, whether monocyclic or polycyclic, and preferably monocyclic or bicyclic. For the purposes of the invention, it should be understood that the term "polycyclic aromatic radical" means a radical having two or more aromatic rings condensed (ortho-condensed, or ortho-condensed and peri-condensed) with one another, that is to say having, pairwise, at least two carbons in common. As an example of an aryl, mention may be made for example of phenyl radicals.

Examples of polyorganosiloxanes (B) are linear and cyclic compounds such as: dimethylvinylsilyl-terminated dimethylpolysiloxanes, trimethylsilyl-terminated (methylvinyl)(dimethyl)polysiloxane copolymers, dimethylvinylsilyl-terminated (methylvinyl)(dimethyl)polysiloxane copolymers and cyclic methylvinylpolysiloxanes. The polyorganosiloxanes (B) most intentionally employed are α,ω-(dimethylvinylsiloxy)polydimethylsiloxanes or polyorganosiloxanes of the poly(dimethylsiloxy)-(methylvinylsiloxy)-α,ω-(dimethylvinylsiloxy) type.

The polyorganosiloxanes (C) according to the invention have, per molecule, a single $C_2$-$C_6$ alkenyl unsaturated functional group X linked to the silicon. The term "alkenyl" is understood to mean a linear or branched, substituted or unsubstituted, unsaturated hydrocarbon chain having at least one olefinic double bond and more preferably just one double bond. Preferably, the alkenyl group has 2 to 8 carbon atoms, better still 2 to 6 carbon atoms. This hydrocarbon chain optionally includes at least one heteroatom such as O, N or S. Preferred examples of alkenyl groups are vinyl, allyl and homoallyl groups, a vinyl group being particularly preferred.

These polyorganosiloxanes (C) may also include identical or different radicals $R^2$ and $R^3$ that meet the same definition as that for the radicals R and $R^1$ defined above.

The preferred polyorganosiloxanes (C) according to the invention are monofunctional polyorganosiloxanes such as (dimethylvinylsiloxy)polydimethylsiloxanes or polyorganosiloxanes of the poly(dimethylsiloxy)-(methylvinylsiloxy)-α,ω-(trimethylsiloxy) type.

Also present in the compositions according to the invention are two types of hydrogenopolyorganosiloxane (D), one (D-1) having a chain extender role and the other (D-2) having a crosslinking role. The chain extender hydrogenopolyorganosiloxanes (D-1) have two SiH links per molecule on terminal siloxyl units such as, for example, hydrogenodimethylsilyl-terminated dimethylpolysiloxanes. The crosslinking hydrogenopolyorganosiloxanes (D-2) have, per molecule, at least three SiH bonds on pendent and terminal siloxyl units. By way of illustration, the following may be mentioned: copolymers having trimethylsilyl-terminated (dimethyl)(hydrogenomethyl)polysiloxane units, copolymers having hydrogenodimethylsilyl-terminated (dimethyl)(hydrogenomethyl)polysiloxane units, trimethylsilyl-terminated hydrogenomethylpolysiloxanes and cyclic hydrogenomethylpolysiloxanes. Preferably, the crosslinking hydrogenopolyorganosiloxanes (D-2) are hydrogenodimethylsilyl-terminated poly(dimethyl)-(hydrogenomethyl)polysiloxane oils.

The hydrogenopolyorganosiloxanes (D) may also include identical or different radicals $R^4$, $R^5$, $R^6$ and $R^5$ that meet the same definition as that for the radicals R and $R^1$ defined above.

The silicone compositions according to the invention may further include at least one unreactive polyorganosiloxane (H), especially in oil or resin form, generally so as to adjust the viscosity of the composition or to act as a diluent. This polyorganosiloxane (H) comprises no alkenylsilyl and/or hydrogenosilyl reactive groups. These unreactive polyorganosiloxanes (H) may also include identical or different radicals $R^8$ and $R^9$ that meet the same definition as that for the radicals R and $R^1$ defined above.

Advantageously, the unreactive polyorganosiloxane (H) is a trimethylsilyl-terminated dimethylpolysiloxane oil.

As other examples of monovalent hydrocarbon groups R, $R^1$, $R^2$, $R^3$, $R^4$, $R^5$, $R^6$, $R^7$, $R^8$ and $R^9$ that may be present in the aforementioned polyorganosiloxanes (B), (C), (D) and optionally (H), the following may be mentioned: methyl; ethyl n-propyl; i-propyl; n-butyl; i-butyl, t-butyl; chloromethyl; dichloromethyl; α-chloroethyl; α,β-dichloroethyl, fluoromethyl; difluoromethyl; α,β-difluoroethyl; trifluoro-3, 3,3-propyl; trifluorocyclopropyl; trifluoro-4,4,4-butyl; hexafluoro-3,3,5,5,5,5-pentyl; β-cyanoethyl; γ-cyanopropyl; phenyl; p-chlorophenyl; m-chlorophenyl; dichloro-3,5-phenyl; trichlorophenyl; tetrachlorophenyl; o-, p- or m-tolyl; α,α,α-trifluorotolyl; xylyls such as dimethyl-2,3-phenyl; and dimethyl-3,4-phenyl. Preferably, the radicals R, $R^1$, $R^2$, $R^3$, $R^4$, $R^5$, $R^6$ and $R^7$ linked to the silicon atoms are methyl or phenyl radicals, these radicals possibly being optionally halogenated, or else cyanoalkyl radicals. The halogens are for example fluorine, chlorine, bromine and iodine, preferably chlorine or fluorine.

As regards the mineral fillers (E), reinforcing or bulking fillers are preferred. The reinforcing fillers are preferably fumed silicas or precipitated silicas. Silica mineral fillers preferably have a specific surface area, measured using the BET process, of at least 50 $m^2/g$, especially between 50 and 400 $m^2/g$ and preferably greater than 70 $m^2/g$, a mean size of the primary particles of less than 0.1 microns (μm) and a bulk density of less than 200 g/liter.

The silica mineral fillers, which are preferably hydrophilic, may be incorporated as such into the silicone composition or possibly treated with a compatibilizing agent. According to a variant, these silicas may optionally be treated with one or more organosilicon compounds, for example an organosilane or organosilazane, normally used for this purpose. Among such compounds are the following: methylpolysiloxanes, such as hexamethyldisiloxane and octamethylcyclotetrasiloxane; methylpolysilazanes, such as hexamethyldisilazane, hexamethylcyclotrisilazane and tetramethyldivinyldisilazane, chlorosilanes, such as dimethyldichlorosilane, trimethylchlorosilane, methylvinyldichlorosilane and dimethylvinylchlorosilane; and alkoxysilanes, such as dimethyldimethoxysilane, dimethylvinylethoxysilane and trimethylmethoxysilane. These compounds may be used by themselves or as mixtures.

Optionally, the silica may be predispersed in a silicone oil so as to obtain a suspension. In particular, it is preferable to use a suspension of fumed silica, especially treated with hexamethyldisilazane, in a polyorganosiloxane oil, especially a polyvinylsiloxane oil.

In addition to the preferred silica as mineral filler (E), other types of fillers, especially bulking fillers, such as for example ground quartz, diatomaceous earth, calcium carbonate and/or kaolin, may be added to the composition.

In respect of the component (F), the expression "effective amount of at least one hydrosilylation reaction catalyst" is understood to mean the amount sufficient to initiate the hydrosilylation reaction. As regards the catalytically effective amount to be used, it goes without saying that a person skilled in the art in question is perfectly capable of determining the optimum amount of catalyst in order to promote the hydrosilylation reaction. This amount depends in particular on the nature of the catalyst and on the polyorganosiloxanes involved. To be more specific, it may be pointed out that said amount is between 0.001 and 0.5% by weight relative to the total weight of the composition (A).

As crosslinking catalyst (F), it is possible in particular to choose a catalyst consisting of at least one metal or compound of the platinum group. The metals of the platinum group are those known by the name platinoids, this name covering, apart from platinum, ruthenium, rhodium, palladium, osmium and iridium. Preferably, platinum or rhodium compounds are used. The following may for example be mentioned: black platinum, chloroplatinic acid, alcohol-modified chloroplatinic acid, a complex of chloroplatinic acid with an olefin, an aldehyde, a vinylsiloxane or an acetylenic alcohol, among others. U.S. Pat. No. 2,823,218 discloses a chloroplatinic acid hydrosilylation catalyst and the U.S. Pat. No. 3,419,593 relates to catalysts formed by chloroplatinic acid/vinylsiloxane-type organosilicone complexes. Platinum/hydrocarbon complexes useful as hydrosilylation catalyst are disclosed by the U.S. Pat. Nos. 3,159,601 and 3,159,662. The U.S. Pat. No. 3,723,497 describes a platinum acetylacetonate and the subject of U.S. Pat. No. 3,220,972 is catalysts based on platinum alcoholates.

As crosslinking inhibitor (G), it is possible to use those conventionally employed in POS crosslinking reactions. They may especially be chosen from the following compounds:

polyorganosiloxanes substituted with at least one alkenyl that may possibly be in cyclic form, tetramethylvinyltetrasiloxane being particularly preferred;
  pyridine;
  organic phosphites and phosphines;
  unsaturated amides;
  alkylated maleates; and
  acetylenic alcohols.

As acetylenic alcohols (cf. FR 1528464 and FR 2372874), which form part of the preferred thermal hydrosilylation reaction blockers, the following may especially be chosen: 1-ethynyl-1-cyclohexanol, 3-methyl-1-dodecyn-3-ol, 3,7,11-trimethyl-1-dodecyn-3-ol, 1,1-diphenyl-2-propyn-1-ol, 3-ethyl-6-ethyl-1-nonyn-3-ol, 2-methyl-3-butyn-2-ol and 3-methyl-1-pentadecyn-3-ol.

Furthermore, the silicone composition (A) according to the invention may also contain other conventional formulation additives (I), such as dyes, pigments, fire retardants, bactericides, mineral or organic pigments.

The present invention also relates to a coated textile that can be obtained by the process as defined above.

The textiles thus obtained, as such or converted into textile articles, may be used in many applications such as, for example, in the clothing field, especially lingerie such as lace at the top of tights or for brassieres, and hygiene articles, such as support strips or bandages. These textile articles may be repositioned at various places on the body or on a garment for example by virtue of the adhesion provided by the silicone elastomer.

The present invention also relates to the use of the silicone composition (A) as defined above for coating a textile and more particularly a lace or an elastic strip.

A specific language has been used in the description so as to make it easier to understand the principle of the invention. However, it should be understood that no limitation of the scope of the invention is envisaged by the use of this specific language. Modifications and improvements may in particular be envisioned by a person skilled in the art in question, based on his own general knowledge. The term "and/or" includes the meaning "and" and the meaning "or", as well as all other possible combinations of the elements connected to this term.

Further details or advantages of the invention will become more clearly apparent in view of the examples given below solely by way of indication.

EXAMPLES

Compositions

The various compounds used to prepare the silicone compositions are detailed in table 1 below.

NB: For all the examples, PDMS oil=polydimethylsiloxane oil.

TABLE 1

| Compound B | α,ω-vinylated PDMS oil of 100 000 mPa·s viscosity | Vi-1 oil |
| | α,ω-vinylated PDMS oil of 600 mPa·s viscosity | Vi-2 oil |
| | α,ω-vinylated PDMS oil of 60 000 mPa·s viscosity | Vi-3 oil |
| Compound C | PDMS oil with one vinyl unit per molecule of 1000 mPa·s viscosity | MonoVi oil |
| Compound D-1 | α,ω-hydrogenated PDMS oil with an SiH content of 0.2 wt % | Extending oil H-1 |
| Compound D-2 | α,ω-hydrogenated PDMS oil also containing methylhydrogenosiloxane units with an SiH content of 0.25 wt % | Crosslinking oil H-2 |
| | α,ω-hydrogenated PDMS oil also containing methylhydrogenosiloxane units with an SiH content of 0.17 wt % | Crosslinking oil H-3 |
| Compound E | Silica of 200 m²/g specific surface area, treated with hexamethyldisilazane | Treated silica |
| Compound F | Catalyst of Karstedt complex type (10 wt % platinum element) | Catalyst |
| Compound G | Ethynylcyclohexanol | ECH inhibitor |

The various two-component compositions (parts A and B) tested are detailed in Table 2 below. For each of the trials, 100 parts by weight of Part A were mixed with 10 parts by weight of part B.

TABLE 2

| | Example 1 (invention) | Example 2 (invention) | Comparative Example 1 | Comparative Example 2 | Comparative Example 3 | Comparative Example 4 |
|---|---|---|---|---|---|---|
| Composition of Part A (in wt %) | | | | | | |
| Oil Vi-1 | 51 | 54.3 | 50.7 | 67 | 48.2 | 69.6 |
| Oil Vi-3 | 14.8 | 13.3 | 14.8 | 14.8 | 14.8 | |
| Oil Vi-2 | | | | | 17.8 | 16.25 |
| MonoVi oil | 15 | 15 | 15 | | | |
| Extending oil H-1 | 1.8 | 1.8 | 1.8 | 1 | 1.8 | 1.6 |
| Crosslinking oil H-2 | 0.4 | 0.3 | 0.7 | 0.22 | 0.4 | |
| Crosslinking oil H-3 | | | | | | 1.05 |
| ECH inhibitor | 0.015 | 0.015 | 0.015 | 0.015 | 0.015 | 0.015 |
| Treated silica | 16.5 | 14.9 | 16.5 | 16.5 | 16.5 | 8.25 |
| Composition of Part B (in wt %) | | | | | | |
| Oil Vi-1 | 99.87 | 99.87 | 99.87 | 99.87 | 99.87 | 99.87 |
| Catalyst | 0.13 | 0.13 | 0.13 | 0.13 | 0.13 | 0.13 |
| SiH/SiVi molar ratio r | 1.15 | 1.16 | 1.37 | 0.84 | 0.9 | 1.04 |
| $SiH_{crosslink}$/SiVi molar ratio r2 | 0.3 | 0.2 | 0.45 | 0.22 | 0.22 | 0.38 |

All the silicone compositions tested were nontoxic and odorless.

For each of the compositions tested, two types of test were carried out.

1. Process According to the Invention:

After parts A and B were mixed together, the composition was continuously coated with a thickness of 0.3 mm on a standard knitted lace based on polyamide, polyester and elastane. The coated lace was then placed in an oven at a temperature of 90° C. for 5 minutes so as to crosslink the silicone compositions. No transfer of the silicone composition from the other side of the lace was observed.

Two tests were used to determine the performance of the textiles after coating and crosslinking using the compositions described above.

Oil leaching test: the lace, after coating and crosslinking of the silicone composition, were placed with its coated side in contact with kraft paper for four days. A visual check was then made on the kraft paper to measure any oil leaching.
- clean kraft paper: no oil leaching (0);
- greasy kraft paper: oil leaching classified according to the deposit observed on the kraft paper; very slight (level 1) to very substantial (level 4).

An oil leaching level above 2 is considered to be unacceptable.

User comfort test: for each of the coated laces, the feeling by the user was determined: unpleasant tacky sensation or irksome compression sensation; and a check made as to whether the nonslip function was properly fulfilled.

2. Properties of the Silicone Elastomer Obtained after Crosslinking of the Various Compositions Tested Measurement of the Elastic Modulus According to the ISO R37 or AFNOR T46002 Standard After parts A and B were mixed together, the composition obtained was crosslinked in a press for 30 minutes at 120° C. The elastomer slabs obtained were cut into dumbbell specimens. The test consisted in pulling the dumbbell specimens of given dimensions until they broke, using a tensile testing machine capable of ensuring a constant jaw separation rate, and using an extensometer. The modulus reached at 100% elongation expressed in MPa was measured, this being the ratio of the stress exerted to the elongation obtained. The higher this value, the higher the elastic modulus of the textile material coated with this elastomer and the higher the compression felt by the user.

Friction Test for Evaluating the Adhesion or Tack:

After parts A and B were mixed together, the composition was coated with a thickness of 0.1 mm on a bristol board measuring 10 cm×5 cm and then crosslinked for 5 minutes at 90° C.

The bristol board thus coated was attached to a wire so as to be pulled. In order to be able to exert the force over the entire width of the specimen, the latter was clamped in a jaw provided with teeth, the jaw itself being attached to the pull wire. The specimen was placed with its coated side against a support made of an epoxy resin and a weight of 200 g was applied on top of it for 1 to 2 minutes, just before the test, so that the tacky surface was in uniform contact with the support. The recorded measurement was the maximum force needed to completely delaminate the specimen from the support, expressed in newtons. The higher this maximum force, the greater the adhesion of the textile specimen to the user's skin.

Table 3 below gives all the results obtained.

Table 3 above shows that only the compositions according to the invention (examples 1 and 2), that is to say the compositions containing a monovinyl polyorganosiloxane and in which the $SiH_{crosslink}/SiVi$ molar ratio $r_2$ is between 0.10 and 0.40, make it possible to obtain the good compromise in performance, that is to say a nonslip function provided, but without an unpleasant tacky sensation or irksome compression for the user, and with a low amount of leaching of oily species manifested by few greasy deposits observed.

The following two conditions:
1) presence of a polyorganosiloxane with a single alkenyl unit per monoalkenylated polyorganosiloxane molecule; and
2) a molar ratio $r_2$ of the hydrogen atoms linked to the silicon of the crosslinking hydrogenopolyorganosiloxanes (D-2) to the alkenyl radicals linked to the silicon of the polyorganosiloxanes (B) and (C) of between 0.10 and 0.40, are necessary for obtaining a coated textile with a good level of tack on the skin without an irksome compression sensation for the user. This is illustrated by comparative example 1 (presence of monovinylated oil but an $SiH_{crosslink}/SiVi$ ratio of 0.45) and comparative example 4 (an $SiH_{crosslink}/SiVi$ ratio of 0.38, but absence of monovinylated oil).

The tacky sensation may be linked to the results obtained in the friction test for assessing the tack, and the compression sensation may be linked to the elastic modulus of the elastomer used. Specifically, when the necessary debonding force is less than 35 N (comparative tests 1 and 4), the user has no tacky sensation, but the elastic modulus of the coated elastomer is high and the user has an irksome compression sensation. On the other hand, when the measured necessary debonding force is greater than 55 N (comparative tests 2 and 3), the user experiences an unpleasant tacky sensation, which is unacceptable for the application.

Comparative examples 2 and 3 show that, when the silicone composition does not contain a monovinylated polyorganosiloxane and that the SiH/SiVi molar ratio is less than 1, the level of tack is too high (94 and 101 N) and the leaching of oily substance, determined via the greasy deposit on kraft paper, is unacceptable (levels 4 and 5).

The invention claimed is:

1. A process for coating a silicone composition (A), which is a precursor of an elastomer and is polyaddition-crosslinkable, onto a textile medium, said process comprising the following steps a), b) and c):

TABLE 3

|  | Example 1 (invention) | Example 2 (invention) | Comparative Example 1 | Comparative Example 2 | Comparative Example 3 | Comparative Example 4 |
|---|---|---|---|---|---|---|
| Composition characteristics |  |  |  |  |  |  |
| MonoVi oil (wt %) | 15 | 15 | 15 | 0 | 0 | 0 |
| SiH/SiVi molar ratio r | 1.15 | 1.16 | 1.37 | 0.84 | 0.9 | 1.04 |
| $SiH_{crosslink}/SiVi$ molar ratio r2 | 0.3 | 0.2 | 0.45 | 0.22 | 0.22 | 0.38 |
| Coated lace properties |  |  |  |  |  |  |
| Presence of greasy deposits | 1 | 2 | 1 | 4 | 5 | 0 |
| Unpleasant tacky sensation | No | No | No | yes | yes | No |
| Irksome compression sensation | No | No | yes | No | No | yes |
| Nonslip function fulfilled | yes | yes | yes | yes | yes | yes |
| Elastomer properties |  |  |  |  |  |  |
| Tack - debonding force (N) | 44 | 52 | 33 | 94 | 101 | 30 |
| Elastic modulus at 100% elongation (MPa) | 0.1 | <0.1 | 0.2 | not determined | not determined | 0.25 | a) preparing a silicone composition (A) which is a precursor of an elastomer and is polyaddition-crosslinkable, comprising:
  at least one linear or branched polyorganosiloxane (B) carrying alkenyl groups and comprising:
  1) terminal siloxyl units of type $M=(X)_s(R)_tSiO_{1/2}$ in which the radicals R, which are identical or different, correspond to a $C_1$-$C_6$ linear or branched alkyl group, optionally substituted, or a substituted or unsubstituted aryl group, and the radicals X correspond to alkenyl groups having 2 to 6 carbon atoms, with s=0 or 1, t=2 or 3 and s+t=3; and
  2) siloxyl units, which are identical or different, of type $D=(X)_u(R^1)_vSiO_{2/2}$ in which the radicals $R^1$ meet the same definition as for R, the radicals X correspond to alkenyl groups having 2 to 6 carbon atoms, with u=0 or 1, v=1 or 2 and u+v=2,
with the condition that the polyorganosiloxane (B) comprises at least two radicals X per molecule;
  at least one linear or branched polyorganosiloxane (C) carrying one alkenyl group per molecule and comprising:
  1) terminal siloxyl units, which are identical or different, of type $M=(X)_w(R^2)_xSiO_{1/2}$ in which the radicals X correspond to alkenyl groups having 2 to 6 carbon atoms, and the radicals $R^2$ meet the same definition as for R, with w=0 or 1, x=2 or 3 and w+x=3; and
  2) siloxyl units $D=(X)_y(R^3)_zSiO_{2/2}$ in which the radicals X correspond to alkenyl groups having 2 to 6 carbon atoms, and the radicals $R^3$ meet the same definition as for R, with y=0 or 1, z=1 or 2 and y+z=2,
with the condition whereby the polyorganosiloxane (C) comprises just one radical X per molecule;
  at least two hydrogenopolyorganosiloxanes (D), one (D-1) having a chain extender role and the other (D-2) having a crosslinking role:
  said chain extender hydrogenopolyorganosiloxane (D-1) comprising:
  1) terminal siloxyl units of type $M=(R^4)_2(H)SiO_{1/2}$ in which the radicals $R^4$ meet the same definition as for R and
  2) siloxyl units, which are identical or different, of type $D=(R^5)_2SiO_{2/2}$ in which the radicals $R^5$ meet the same definition as for R,
with the condition that the chain extender hydrogenopolyorganosiloxane (D-1) comprises two SiH functional groups per molecule;
  said crosslinking hydrogenopolyorganosiloxane (D-2) comprising:
  1) terminal siloxyl units of type $M=(R^6)_2(H)SiO_{1/2}$ in which the radicals $R^6$ meet the same definition as for R and
  2) siloxyl units, which are identical or different, of type $D=(R^7)_p(H)_qSiO_{2/2}$ in which the radicals $R^7$ meet the same definition as for R, with p=1 or 2, q=0 or 1 and p+q=2,
with the condition whereby that the crosslinking hydrogenopolyorganosiloxane (D-2) comprises at least three SiH functional groups per molecule;
  at least one mineral filler (E);
  catalytically effective amount of at least one hydrosilylation catalyst (F);
  at least one crosslinking inhibitor (G);
  optionally at least one unreactive polyorganosiloxane (H) comprising:
  1) terminal siloxyl units of type $M=(R^8)_3SiO_{1/2}$ in which the radicals $R^8$ meet the same definition as for R and
  2) siloxyl units, which are identical or different, of type $D=(R^9)_2SiO_{2/2}$ in which the radicals $R^9$ meet the same definition as for R, and
  optionally a formulation additive (I),
with the additional condition that the amounts of the polyorganosiloxanes (B), (C) and (D) are chosen so that the molar ratio r2 of the hydrogen atoms linked to the silicone of the crosslinking hydrogenopolyorganosiloxanes (D-2) for the alkenyl radicals linked to the silicon of the polyorganosiloxanes (B) and (C) is defined as follows:
  $0.10 \leq r_2 \leq 0.40$,
  b) next, said silicone composition (A) is deposited continuously or discontinuously on said textile medium; and
  c) crosslinking said silicone composition (A) by heating and/or by infrared radiation.

2. The process as claimed in claim 1, wherein the polyorganosiloxanes (B), (C) and (D) are added to the silicone composition (A) so that the molar ratio r of the hydrogen atoms linked to the silicon of the hydrogenopolyorganosiloxanes (D-1) and (D-2) to the alkenyl radicals linked to the silicon of the polyorganosiloxanes (B) and (C) is greater than 1.

3. The process as claimed in claim 1, wherein the silicone composition (A) has a dynamic viscosity of greater than 100 000 mPa·s.

4. The process as claimed in claim 1, wherein the silicone composition (A) is obtained by mixing at least two parts P1 and P2 comprising the constituents (B) to (G) and optionally (H) and (I), with the condition that a catalyst (F) for the hydrosilylation reaction is separate from the constituent (D).

5. The process as claimed in claim 1, wherein the silicone composition (A) comprises the constituents (B) to (I) in the following proportions, expressed as percentage by weight relative to the total weight of the silicone composition (A):
  (B) from 40 to 90
  (C) from 4 to 20
  (D-1) from 1 to 2
  (D-2) from 0.1 to 0.6
  (E) from 5 to 20
  (F) from 0.005 to 0.25
  (G) from 0.010 to 0.020
  (H) from 0 to 10
  (I) from 0 to 5.

6. The process as claimed in claim 1, wherein in step b) said silicone composition (A) is deposited on the textile medium by a transfer roll coater, by a lick roll coater or by spraying using a nozzle, a doctor blade, a rotary frame or by a reverse roll coater.

7. The process as claimed in claim 1, wherein the textile medium is a lace or an elastic strip.

8. A silicone composition (A) which is a precursor of an elastomer and is polyaddition-crosslinkable, comprising:
  at least one linear or branched polyorganosiloxane (B) carrying alkenyl groups and comprising:
  1) terminal siloxyl units of type $M=(X)_s(R)_tSiO_{1/2}$ in which the radicals R, which are identical or different, correspond to a $C_1$-$C_6$ linear or branched alkyl group, optionally substituted, or a substituted or unsubstituted aryl group, and the radicals X correspond to alkenyl groups having 2 to 6 carbon atoms, with s=0 or 1, t=2 or 3 and s+t=3; and
  2) siloxyl units, which are identical or different, of type $D=(X)_u(R^1)_vSiO_{2/2}$ in which the radicals $R^1$ meet the same definition as for R, the radicals X correspond to alkenyl groups having 2 to 6 carbon atoms, with u=0 or 1, v=1 or 2 and u+v=2, with the condition whereby the polyorganosiloxane (B) comprises at least two radicals X per molecule;

at least one linear or branched polyorganosiloxane (C) carrying one alkenyl group per molecule and comprising:

1) terminal siloxyl units, which are identical or different, of type $M=(X)_w(R^2)_xSiO_{1/2}$ in which the radicals X correspond to alkenyl groups having 2 to 6 carbon atoms, and the radicals $R^2$ meet the same definition as for R, with w=0 or 1, x=2 or 3 and w+x=3; and 2) siloxyl units $D=(X)_y(R^3)_zSiO_{2/2}$ in which the radicals X correspond to alkenyl groups having 2 to 6 carbon atoms, and the radicals $R^3$ meet the same definition as for R, with y=0 or 1, z=1 or 2 and y+z=2, with the condition whereby the polyorganosiloxane (C) comprises just one radical X per molecule;

at least two hydrogenopolyorganosiloxanes (D), one (D-1) having a chain extender role and the other (D-2) having a crosslinking role:

said chain extender hydrogenopolyorganosiloxane (D-1) comprising:

1) terminal siloxyl units of type $M=(R^4)_2(H)SiO_{1/2}$ in which the radicals $R^4$ meet the same definition as for R and 2) siloxyl units, which are identical or different, of type $D=(R^5)_2SiO_{2/2}$ in which the radicals $R^5$ meet the same definition as for R, with the condition that the chain extender hydrogenopolyorganosiloxane (D-1) comprises two SiH functional groups per molecule;

said crosslinking hydrogenopolyorganosiloxane (D-2) comprising:

1) terminal siloxyl units of type $M=(R^6)_2(H)SiO_{1/2}$ in which the radicals $R^6$ meet the same definition as for R and 2) siloxyl units, which are identical or different, of type $D=(R^7)_p(H)_qSiO_{2/2}$ in which the radicals $R^7$ meet the same definition as for R, with p=1 or 2, q=0 or 1 and p+q=2, with the condition that the crosslinking hydrogenopolyorganosiloxane (D-2) comprises at least three SiH functional groups per molecule;

at least one mineral filler (E);

catalytically effective amount of at least one hydrosilylation catalyst (F);

at least one crosslinking inhibitor (G);

optionally at least one unreactive polyorganosiloxane (H) comprising:

1) terminal siloxyl units of type $M=(R^8)_3SiO_{1/2}$ in which the radicals $R^8$ meet the same definition as for R and 2) siloxyl units, which are identical or different, of type $D=(R^9)_2SiO_{2/2}$ in which the radicals $R^9$ meet the same definition as for R, and optionally a formulation additive (I), with the additional condition that the amounts of the polyorganosiloxanes (B), (C) and (D) are chosen so that the molar ratio $r_2$ of the hydrogen atoms linked to the silicon of the crosslinking hydrogenopolyorganosiloxanes (D-2) to the alkenyl radicals linked to the silicon of the polyorganosiloxanes (B) and (C) is defined as follows:
$0.10 \leq r_2 \leq 0.40$.

9. The silicone composition (A) as claimed in claim 8, wherein the polyorganosiloxanes (B), (C) and (D) have been added to the silicone composition (A) so that the molar ratio r of the hydrogen atoms linked to the silicon of the hydrogenopolyorganosiloxanes (D-1) and (D-2) to the alkenyl radicals linked to the silicon of the polyorganosiloxanes (B) and (C) is greater than 1.

10. A coated textile that can be obtained by the process as claimed in claim 1.

11. A silicone composition (A) as defined in claim 8 for coating a textile medium.

12. The process as claimed in claim 1 with the additional condition that the amounts of the polyorganosiloxanes (B), (C) and (D) are chosen so that the molar ratio $r_2$ of the hydrogen atoms linked to the silicone of the crosslinking hydrogenopolyorganosiloxanes (D-2) for the alkenyl radicals linked to the silicon of the polyorganosiloxanes (B) and (C) is defined as follows:
$0.15 \leq r_2 \leq 0.35$.

13. The process as claimed in claim 1 with the additional condition that the amounts of the polyorganosiloxanes (B), (C) and (D) are chosen so that the molar ratio r2 of the hydrogen atoms linked to the silicone of the crosslinking hydrogenopolyorganosiloxanes (D-2) for the alkenyl radicals linked to the silicon of the polyorganosiloxanes (B) and (C) is defined as follows:
$0.20 \leq r_2 \leq 0.30$.

14. The process as claimed in claim 1, wherein the polyorganosiloxanes (B), (C) and (D) are added to the silicone composition (A) so that the molar ratio r of the hydrogen atoms linked to the silicon of the hydrogenopolyorganosiloxanes (D-1) and (D-2) to the alkenyl radicals linked to the silicon of the polyorganosiloxanes (B) and (C) is between 1 and 1.35.

15. The silicone composition as claimed in claim 8 with the additional condition that the amounts of the polyorganosiloxanes (B), (C) and (D) are chosen so that the molar ratio r2 of the hydrogen atoms linked to the silicone of the crosslinking hydrogenopolyorganosiloxanes (D-2) for the alkenyl radicals linked to the silicon of the polyorganosiloxanes (B) and (C) is defined as follows:
$0.15 \leq r_2 \leq 0.35$.

16. The silicone composition as claimed in claim 8 with the additional condition that the amounts of the polyorganosiloxanes (B), (C) and (D) are chosen so that the molar ratio r2 of the hydrogen atoms linked to the silicone of the crosslinking hydrogenopolyorganosiloxanes (D-2) for the alkenyl radicals linked to the silicon of the polyorganosiloxanes (B) and (C) is defined as follows:
$0.20 \leq r_2 \leq 0.30$.

17. The silicone composition (A) as claimed in claim 8, wherein the polyorganosiloxanes (B), (C) and (D) have been added to the silicone composition (A) so that the molar ratio r of the hydrogen atoms linked to the silicon of the hydrogenopolyorganosiloxanes (D-1) and (D-2) to the alkenyl radicals linked to the silicon of the polyorganosiloxanes (B) and (C) is between 1 and 1.35.

18. A silicone composition (A) as defined in claim 8 for coating a textile medium comprising a lace or an elastic strip.

* * * * *